(12) United States Patent
Stratton et al.

(10) Patent No.: US 8,838,320 B2
(45) Date of Patent: Sep. 16, 2014

(54) LASER SENSORS FOR TROLLEY GUIDANCE SIGNAL

(75) Inventors: Ken L. Stratton, Dunlap, IL (US); Eric J. Ruth, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 13/436,810

(22) Filed: Mar. 30, 2012

(65) Prior Publication Data

US 2013/0261868 A1 Oct. 3, 2013

(51) Int. Cl.
*G05D 1/00* (2006.01)
*B62D 6/00* (2006.01)

(52) U.S. Cl.
CPC ... *G05D 1/00* (2013.01); *B62D 6/00* (2013.01)
USPC .............................................. 701/23; 701/41

(58) Field of Classification Search
CPC ........... B60L 5/18; B60M 1/02; B60W 30/16; B61D 3/16; A01B 69/007; G05D 1/00; B62D 6/00
USPC ...................... 701/23, 50, 468, 2, 26, 41, 301; 180/2.1, 167, 401; 191/87; 320/167; 37/197; 342/70
See application file for complete search history.

(56) References Cited

U.S. PATENT DOCUMENTS

| | | | |
|---|---|---|---|
| 4,745,997 A * | 5/1988 | Takei et al. ..................... 191/87 |
| 4,986,384 A * | 1/1991 | Okamoto et al. ............. 180/167 |
| 5,007,496 A * | 4/1991 | Whitten et al. ............... 180/401 |
| 5,293,947 A * | 3/1994 | Stratton ........................ 180/2.1 |
| 5,490,075 A * | 2/1996 | Howard et al. ............... 701/468 |
| 6,140,954 A * | 10/2000 | Sugawara et al. .............. 342/70 |
| 6,438,491 B1 * | 8/2002 | Farmer .......................... 701/301 |
| 7,076,346 B2 * | 7/2006 | Sturges et al. .................. 701/23 |
| 2003/0004644 A1 * | 1/2003 | Farmer .......................... 701/301 |
| 2010/0114404 A1 * | 5/2010 | Donnelly .......................... 701/2 |
| 2010/0198466 A1 * | 8/2010 | Eklund et al. ................... 701/50 |
| 2010/0270983 A1 * | 10/2010 | Gong et al. .................... 320/167 |
| 2011/0094841 A1 | 4/2011 | Mazumdar et al. |
| 2011/0196565 A1 * | 8/2011 | Collins et al. ................... 701/26 |
| 2012/0174445 A1 * | 7/2012 | Jones et al. ..................... 37/197 |

FOREIGN PATENT DOCUMENTS

| | | | | |
|---|---|---|---|---|
| DE | 19907516 A1 * | 9/2000 | ............. B60M 1/02 |
| DE | 10256705 A1 * | 7/2004 | ............. B60L 5/18 |
| DE | 10256705 B4 | 7/2004 | |
| EP | 1591301 | 10/2007 | |
| WO | 2009007879 | 1/2009 | |
| WO | 2010121707 | 10/2010 | |

* cited by examiner

*Primary Examiner* — Tuan C. To
*Assistant Examiner* — Yuri Kan
(74) *Attorney, Agent, or Firm* — Miller, Matthias & Hull (57) ABSTRACT

A system and method for guiding an off-highway truck along a roadway with respect to a trolley line determine a position of the off-highway truck on the roadway by sensing two or more roadside objects and uses the determined position of the off-highway truck and a known position of the trolley line relative to the two or more roadside objects to automatically determine a relative position of the off-highway truck under the trolley line. Based on the relative position of the off-highway truck under the trolley line, the off-highway truck is automatically steered to alter the position of the off-highway truck relative to the trolley line, e.g., to maintain an electrical power flow from the trolley line to the off-highway truck.

20 Claims, 5 Drawing Sheets

LASER SENSORS FOR TROLLEY GUIDANCE SIGNAL

TECHNICAL FIELD OF THE DISCLOSURE

The present disclosure relates to guidance of trolley-driven machines and, more particularly, relates to automatic guidance of a trolley-driven machine during use of a trolley line.

BACKGROUND OF THE DISCLOSURE

Although electric power has many benefits for use in industrial material transport machinery, some of these benefits may be offset by the need to carry, charge and maintain a sufficient source of electric power, e.g., a large battery or other charge storage system. In applications having substantially repeated travel patterns, such as in mine work and other similar contexts, trolley line systems eliminate this problem by providing a path along which a travelling machine may receive electric power from one or more power lines (herein referred to as "trolley lines"). Such trolley lines may be placed continuously along a path, or only at certain portions of the path, such as uphill runs, to provide assist power.

In a trolley system, the source of electrical power, which may be a municipal grid or an on-site generator facility, stays fixed, but the trolley-powered machine nonetheless receives power from the power source anywhere along the trolley lines. As such, the efficiencies of electric power may be obtained when needed without the concomitant complications and expense of large batteries. However, one significant limitation of trolley systems is that the trolley-powered machine must track the trolley lines if it is to receive power there from. In a related vein, the apparatus for electrically connecting the trolley-powered machine to the trolley lines, called a "pantograph," must be raised when the trolley line is to be used, and lowered at other times.

Taking into account the above requirements, the use of a trolley system requires the machine operator to both follow the trolley line accurately and to raise and lower the pantograph at the appropriate locations. Failure to meet either requirement can result in a loss of efficiency, since alternative power such as an onboard engine must be used when the trolley-powered machine is not receiving power from the trolley line. Moreover, misdirection of the machine or the pantograph can result in damage to the machine as well as to the trolley line and associated infrastructure, e.g., lines, line poles, transformers, etc.

Roadside flags are sometimes used to signal the operator regarding locations for raising and lowering the pantograph, and pieces of tape applied to the machine windshield may assist the user in "aiming" the machine along the trolley lines. However, while such techniques may make it easier for the operator to accurately guide the machine, they still require that the operator pay attention to the signals and steer the machine accordingly. Thus, while trolley line usage becomes more efficient through the use of such techniques, a degree of operator fatigue is nonetheless still present.

It will be appreciated that this background section was created by the inventors for the reader's convenience. It is meant to discuss problems and concepts noted by the inventors, and not to discuss or explain prior art unless expressly otherwise noted. Thus the inclusion of any problem or solution in this section is not an indication that the problem or solution is prior art.

SUMMARY OF THE DISCLOSURE

In accordance with one aspect of the present disclosure, a method is provided for guiding an off-highway truck along a roadway with respect to a trolley line. The method includes determining a position of the off-highway truck on the roadway by sensing two or more roadside objects located beside the roadway and using the determined position of the off-highway truck and a known position of the trolley line relative to the two or more roadside objects to automatically determine a relative position of the off-highway truck under the trolley line. Based on the determined relative position of the off-highway truck under the trolley line, the method automatically steers the off-highway truck to alter the position of the off-highway truck relative to the trolley line.

In accordance with another aspect of the disclosure, a system is provided for automatic guidance of an off-highway truck at a work site which includes a trolley line for supplying electric power to the off-highway truck. The trolley line runs along a roadway having roadside features. The system includes a pantograph for selectively contacting the trolley line and one or more sensors associated with the off highway truck. A controller is linked to the one or more sensors and to a machine steering control and is configured to detect a position of the off-highway truck relative to the trolley line by detecting the roadside features and automatically steers the truck via the machine steering control to maintain the pantograph in contact with the trolley line.

In accordance with another aspect of the disclosure, a system is provided for automatic guidance of an off-highway truck having an onboard laser sensor. The system includes a trolley line for supplying electric power to the off-highway truck, the trolley line running along a roadway, as well as a plurality of poles positioned consecutively at a fixed distance from one another in the direction of the roadway and positioned at a fixed distance from the trolley line in a direction perpendicular to the roadway. A reflective element is fixed to each of the plurality of poles at a fixed distance above the roadway such that the laser sensor of the off-highway truck is able to detect two or more of the plurality of poles based on reflections from the reflective elements.

Further features and aspects of the disclosed systems and methods will become apparent from reading the detailed description in conjunction with the attached drawing figures.

While the present disclosure is susceptible to various modifications and alternative constructions, certain illustrative embodiments thereof will be shown and described below in detail. It should be understood, however, that there is no intention to be limited to the specific embodiments disclosed; on the contrary, the intention is to cover all modifications, alternative constructions, and equivalents within the spirit and scope of the present disclosure.

DETAILED DESCRIPTION OF THE DISCLOSURE

Figure 1:
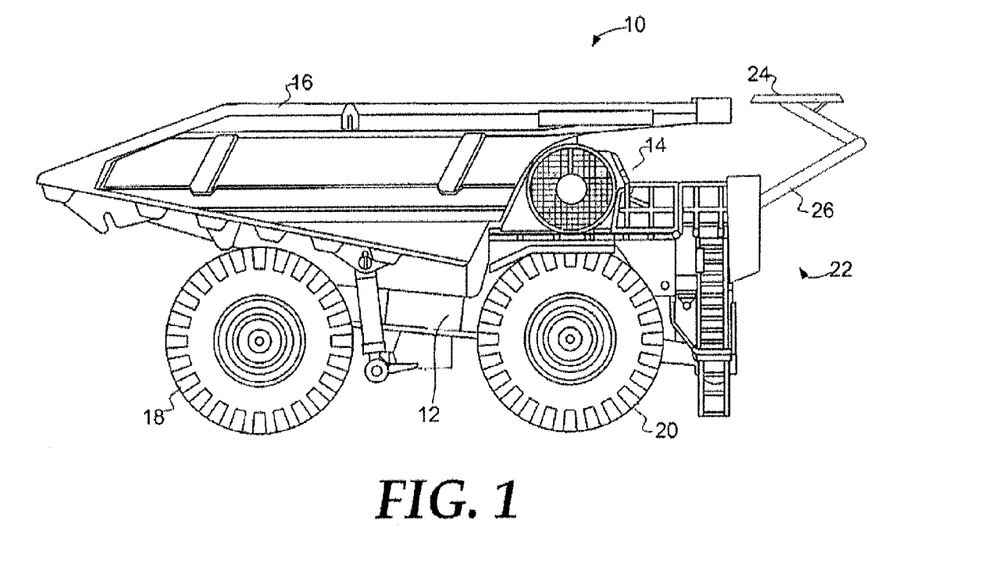
FIG. 1 is an illustration of a side view of a trolley-assisted off-highway truck within which an embodiment of the disclosed principles may be implemented.

The present disclosure relates to a system and method for automatically guiding an off-highway truck to engage and maintain engagement with a trolley line to power the truck. Referring now to FIG. 1, this figure shows a side view of a trolley-assisted off-highway truck 10 within which an embodiment of the disclosed principles may be implemented. The off-highway truck 10 includes a chassis 12 that supports an operator cab 14 and a bucket 16. The bucket 16 is pivotally connected to the chassis 12 and is arranged to carry a payload when the off-highway truck 10 is in service. An operator occupying the operator cab 14 can control the motion and the various functions of the off-highway truck 10.

The chassis 12 supports various drive system components. These drive system components are capable of driving a set of drive wheels 18 to propel the off-highway truck 10. A set of idle wheels 20, optionally powered, can steer using known methods such that the off-highway truck 10 can be directed by the operator. In one embodiment, the drive wheels 18 are arranged at the rear of the chassis 12 and the idle wheels 20 are arranged at the front of the chassis 12. Even though the off-highway truck 10 includes a rigid chassis with powered wheels for motion and steerable wheels for steering, it will be appreciated that other machine configurations can be used. For example, such configurations may include an articulated chassis and/or a chassis supporting a plurality of driven wheel sets.

The off-highway truck 10 includes a self-contained power source such as an engine and fuel and/or electric motor and battery. In this way, the off-highway truck 10 may be self-powered in environments where an external power source is not available. Often however, it is more efficient to make use of external power when available.

To this end, the off-highway truck 10 further includes a mechanism for receiving power from a trolley line. In particular, the off-highway truck 10 includes an operator-controlled pantograph 22. The pantograph 22 includes a plurality of contacts 24 (one visible in this view), each being supported by an associated articulated raising mechanism 26. The operator controls the raising mechanism 26 from within the operator cab 14, such that when there is no trolley line overhead, or it is not desired to use trolley power, the pantograph 22 remains lowered (as shown), and when there is a trolley line overhead and it is desired to use trolley power, the pantograph 22 is raised such that the plurality of contacts 24 come into contact with the conductors of the trolley line.

As noted above, in order to use trolley line power, an operator of an off-highway truck similar to the off-highway truck 10 of FIG. 1 must ensure that the truck is aligned with the trolley line and that the plurality of contacts 24 of the pantograph 22 underlie the line before raising the pantograph 22. However, in an embodiment of the disclosed principles, a user guidance display provides the operator with a visual representation of the off-highway truck 10, and/or the pantograph 22 thereof, in relation to the trolley line. In one embodiment, the user guidance display provides visual cues for alignment along the trolley line. In a further embodiment, visual cues provided include alignment cues as well as cues for positioning in the travelling direction, e.g., to show whether the pantograph 22 underlies the trolley line in the direction of travel.

Figure 2:
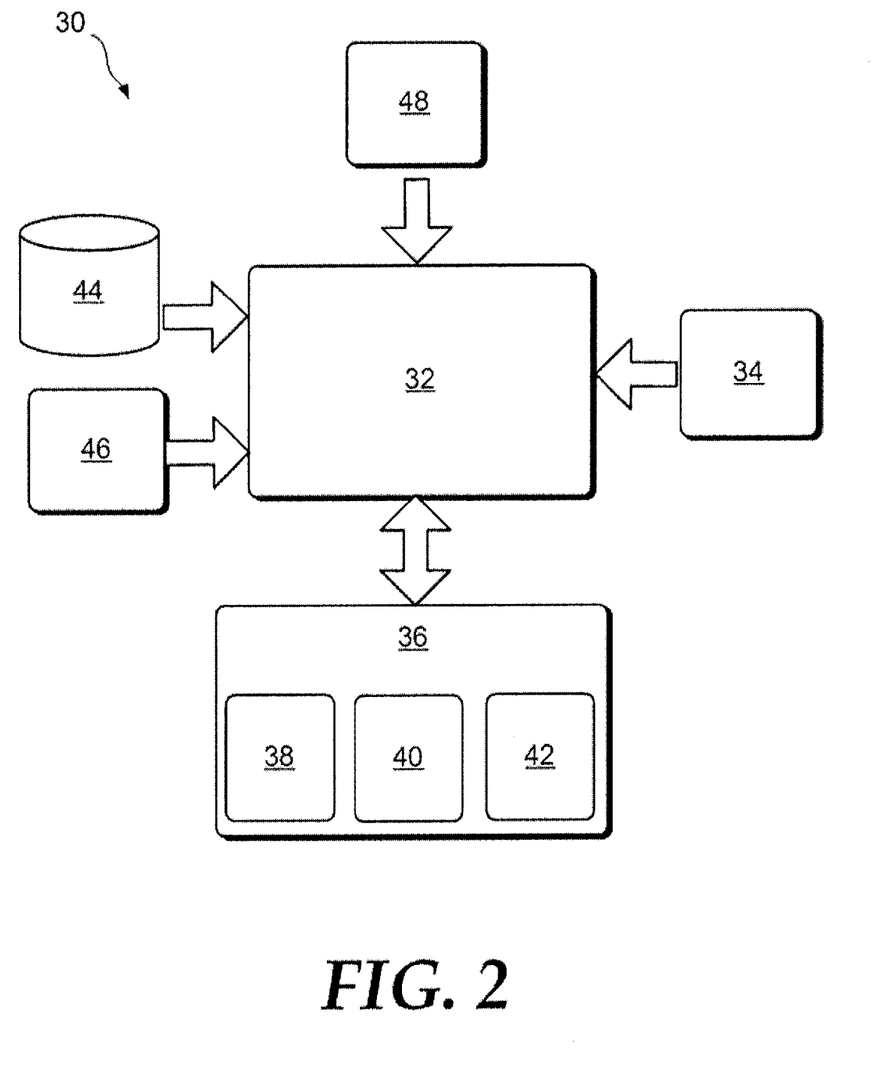
FIG. 2 is a schematic diagram showing a control system for automatic control of an off-highway truck in engagement with a trolley line in accordance with an illustrative embodiment.

With respect to automated control of the off-highway truck 10, FIG. 2 is a schematic diagram showing a machine control system architecture 30 for guiding the off-highway truck 10 in an illustrative embodiment. The core of the control system is a processor configured as a controller 32. The controller 32 may be a dedicated controller or may be embodied in an existing controller such as a machine controller, engine controller, power management controller, etc. In an embodiment, the controller 32 operates by reading computer-executable instructions, e.g., code or programs, from a non-transitory computer-readable medium, e.g., an optical or magnetic disc memory, CD, DVD, flash drive, etc., and executing those instructions. Data used by the controller 32 during execution may be retrieved from the computer-readable medium or from a peripheral source such as a user interface and/or a sensor, to be described in greater detail below.

In an embodiment, the controller 32 is communicatively connected to a number of machine elements including one or more laser distance sensor assemblies 34 and a plurality of machine controls 36. The machine controls 36 include a machine steering control 38, a machine speed control 40, and a pantograph control 42. The controller 32 is also linked to a user interface group 48 in an embodiment. The user interface group 48 includes operator interfaces for machine controls, e.g., steering, speed, pantograph position. In an embodiment, the user interface group 48 also includes a selector to allow the user to activate or deactivate automatic machine guidance along the trolley line.

In addition, the controller 32 is communicatively linked to a data source such as database 44, containing data specifying the lateral location of the trolley line relative to preset roadside markers, as well as data encoding start and stop locations of the trolley line, e.g., via GPS coordinates. In this connection, the controller 32 is also linked to a GPS receiver 46 for receiving data indicative of a current position of the off-highway truck 10.

Each of the one or more laser distance sensor assemblies 34 includes one or more lasers and one or more reflection sensors, e.g., photoreceptors. Depending upon the object or surface illuminated by the light emitted from the laser, the reflection sensor will respond strongly or weakly. For example, if the laser beam is incident on a surface that presents a spectral reflection, e.g., a mirror, and the surface is oriented perpendicularly to the laser beam, then the reflection sensor will respond strongly. In contrast, if the laser is incident on the same surface but the surface is oriented at 45 degrees to the laser beam, then the reflection sensor will respond weakly. In addition, the laser distance sensor assemblies 34 are configured to detect a distance to the reflective object.

In addition to including the foregoing components, each laser distance sensor assembly 34 may also include a scanning mechanism. This mechanism may be mechanical or optical. A mechanical scanner is one that physically redirects the emitting portion of the laser device, while an optical scanner is one that redirects the laser beam without moving the emitting portion of the laser itself. In either case, the ability to scan the laser allows the controller 32 to check the reflectance of a continuous portion of the roadside rather than checking the reflectance of points that are fixed relative to the off-highway truck 10. Given the ability to scan the laser at multiple known angles and the ability to determine reflectance of the structures illuminated by the beam at those angles, the controller 32 has the ability to find position via triangulation, as will be discussed in greater detail below.

As noted above, the controller 32 is linked to a GPS receiver 46 for receiving data indicative of a current position of the off-highway truck 10. Thus, while the triangulation of laser reflections allows the controller 32 to determine the lateral position of the off-highway truck 10 with respect to the trolley line, the controller 32 is also able to identify the position of the off-highway truck linearly along the trolley lines via GPS in an embodiment. Since the controller 32 also has access to the database 44 and can determine the lateral location of the trolley line relative to roadside markers and the start and stop locations of the trolley line, the controller 32 is then able to determine what steps to take to align the off-highway truck 10 with the trolley line as well as when to raise or lower the pantograph 22. An exemplary process for executing this task will be described below.

Figure 3:
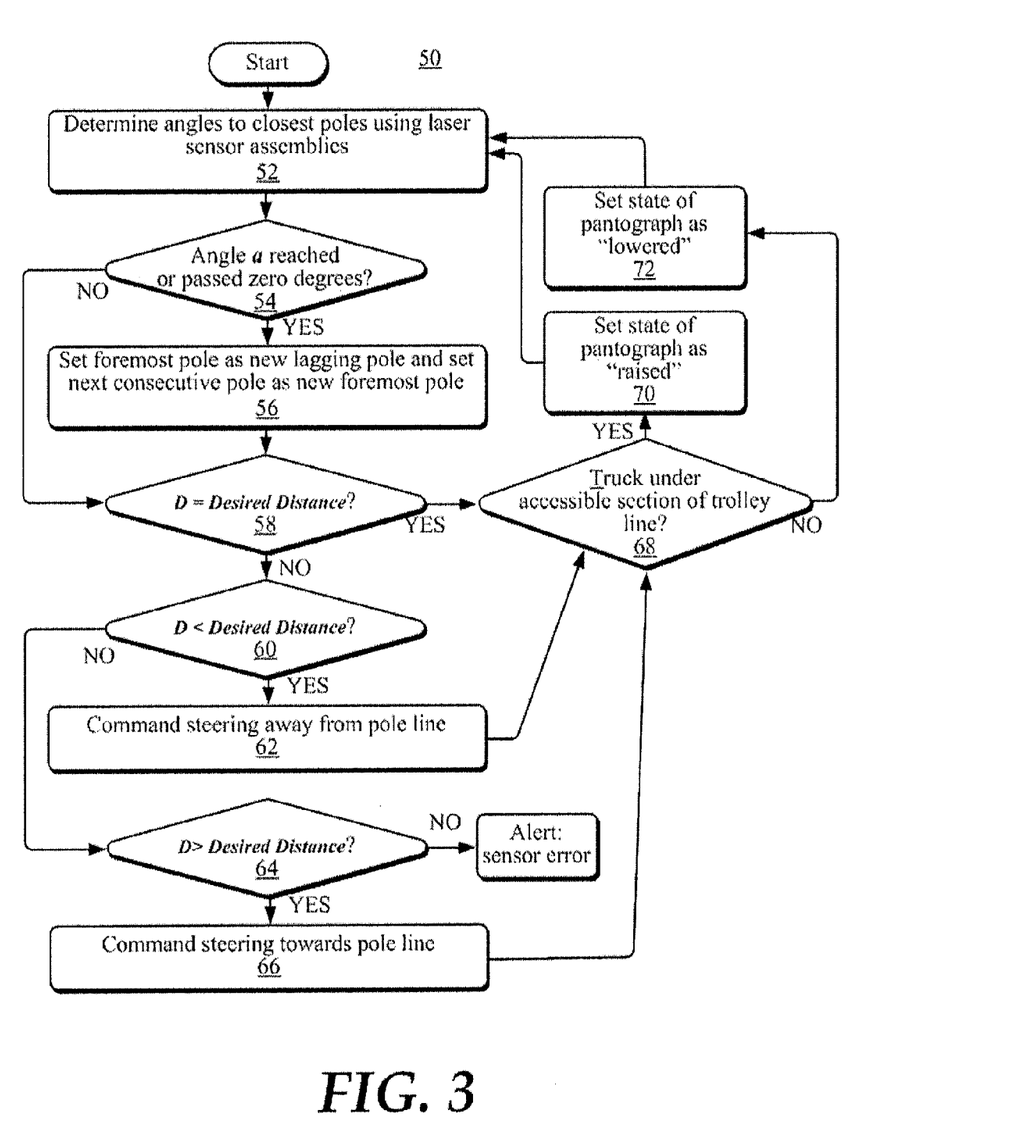
FIG. 3 is a flow chart showing a process of automatic machine guidance in accordance with an aspect of the disclosure.

Turning to FIG. 3, this figure shows a flowchart for executing a machine guidance process 50 in accordance with an illustrative embodiment. The process 50 will be described in the context of the illustrative architecture of FIGS. 1-2, in conjunction with the overhead diagram of FIG. 4.

Figure 4:
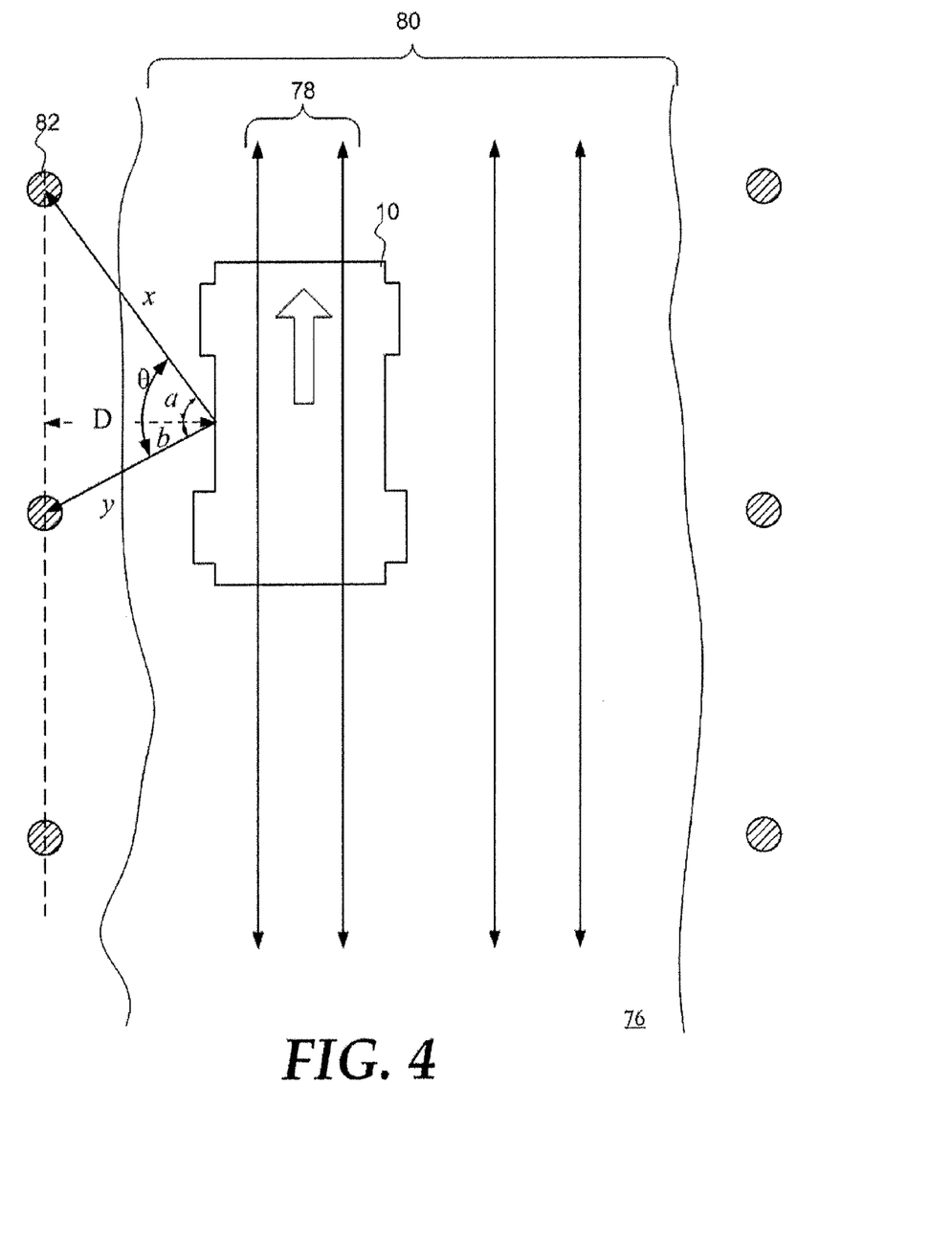
FIG. 4 is a schematic site diagram of a worksite environment within which an aspect of the disclosure is implemented.

As shown in FIG. 4, the work environment 76 of the off-highway truck 10 includes a trolley line 78, typically comprising dual conductive strands, along each lane of a roadway 80. A row of support poles 82 lines each side of the roadway at a fixed distance A from the ideal truck location (the location of the laser distance sensor assembly 34 on the off-highway truck 10 when the off-highway truck 10 is centered under the respective trolley line 78).

Note that the support poles 82 may be used to support the trolley line 78 or may be placed at the roadside simply for reference during automatic guidance. In this arrangement, if the laser illumination of the sensors is directed (or a single sensor scanned) to each of the nearest poles 82, the respective angles to the poles 82, measured relative to a vector that is perpendicular to the roadway 80, can be designated a and b, which sum to θ, the sensed angle between objects.

In one embodiment, the support poles 82 are spaced at a fixed distance D apart from one another, allowing triangulation once the sensed angles and the fixed distance D are known. However, it may be desirable to allow the positions of the support poles to vary slightly with respect to one another in the direction of the roadway. In such a case, the location of the off-highway truck 10 can be determined by knowing the angles and distances sensed to two of the support poles. In the illustrated embodiment, the distance to the sensed poles is x for the front-most pole and y for the rear-most pole.

With the values of x, y, and θ known, the angle a can be represented as:

$$a = \text{Tan}^{-1}(((x/y) - \cos\theta)/\sin\theta).$$

With a now known, the distance D from the sensor assembly to the imaginary line between the poles can be calculated as:

$$D = x \cos(a).$$

It will be appreciated that triangulation is known to those of skill in the art and that any other triangulation calculation or approximation may instead be used.

Returning to FIG. 3, at stage 52 of the process 50, the controller 32 gathers laser sensor data from the laser distance sensor assemblies 34, the gathered data indicating the angles a and b and the distances x and y. In an embodiment, retroreflectors or mirrored corner cubes are located around the circumference of each pole 82 at a height generally matching the height above ground of the laser distance sensor assemblies 34. This enhances reflections from the poles 82 and thus aids the controller 32 in distinguishing a useful range-finding reflection from non-useful reflections such as reflections from trees, rocks, sidelined equipment and so on.

At stage 54, the controller 32 determines whether angle a has reached or passed zero degrees (0°), i.e., whether the off-highway truck 10 has passed the forward-most pole. If it is determined that angle a has reached or passed zero degrees (0°), then the controller 32 directs the laser distance sensor assemblies 34 ahead at stage 56, such that the foremost pole becomes the lagging pole, and the next consecutive pole along the roadway 80 becomes the next foremost pole. The process 50 then moves to stage 58. If it is determined at stage 54 that angle a has not reached or passed zero degrees (0°), then the process 50 proceeds directly to stage 58.

At stage 58, the controller 32 calculates the distance D, e.g., as above, and determines whether D is equal to, greater, or less than a desired distance from the pole line to the trolley line 78. If D is equal to the desired distance, then the process 50 proceeds to stage 68. If D is less than the desired distance, then the process 50 proceeds to stage 62 and the controller 32 commands steering away from the poles 82. In an embodiment, such a command adjusts the steering angle of the machine away from the poles 82 by an increment less than the full range of available steering to avoid unexpected movement of the off-highway truck 10 in the event that an erroneous sensor reading is taken or other malfunction occurs. From stage 62, the process 50 proceeds to stage 68.

If it is determined that D is neither equal to or less than the desired distance, the process 50 proceeds to stage 64, wherein the controller 32 determines whether D is greater than the desired distance. In an embodiment, D is assumed to be greater than the desired distance if it is neither less than or equal to the desired distance. In another embodiment, if D is neither less than or equal to the desired distance, an error is indicated if D is determined not to be greater than the desired distance. If D is greater than the desired distance, then the process 50 proceeds to stage 66 and the controller 32 commands steering toward the poles 82. In an embodiment, such a command adjusts the steering angle of the machine toward from the poles 82 by an increment less than the full range of available steering as discussed above. From stage 66, the process 50 proceeds to stage 68.

Having verified or corrected the steering of the off-highway truck 10 to align the machine with the trolley line 78, the controller 32 proceeds to manage operation of the pantograph in subsequent stages. Thus at stage 68, the controller 32 determines whether the current position of the off-highway truck 10 places it under a section of the trolley line 78 wherein connection to the trolley line 78 is possible, i.e., that the truck is not off the trolley line 78 at the start or end of the line or in an unpowered zone. The relative positions of the off-highway truck 10 and the accessible sections of trolley line 78 may be based on a GPS reading of position taken in conjunction with a position-encoded map of the work site in an embodiment.

If it is determined that the current position of the off-highway truck 10 places it under an accessible section of trolley line 78, the controller 32 sets a state of the pantograph as raised at stage 70. In an embodiment, a raised state entails raising the pantograph if it is not raised, and maintaining the pantograph in a raised position if it is already raised. If it is instead determined that the current position of the off-highway truck 10 does not place it under an accessible section of trolley line 78, the controller 32 sets a state of the pantograph at stage 72 as lowered which, in an embodiment, entails lowering the pantograph if it is raised, and maintaining the pantograph in a lowered position if it is not raised. From stages 70 and 72, the process 50 returns to stage 52 to await further position update data.

In a further embodiment, the controller 32 maintains vehicle speed at a preset speed or a location-dependent speed along the trolley line. Alternatively, the controller 32 may control only steering and pantograph position, and may leave the operator responsible for selecting a machine speed.

In an alternative embodiment to that shown in FIG. 3, the position data used to identify the position of the off-highway truck may be GPS-based rather than sensor-based. While this embodiment eliminates the need for position sensors directed to roadside objects, it may be less robust in circumstances wherein one or more of the three required GPS satellites is shaded or inoperable.

In another alternative embodiment, the trolley line itself may serve as a position indicator via the use of machine vision in the off-highway truck 10. In particular, rather than sensing roadside structures and inferring position based on a sensor data, in this embodiment the physical conductors making up the trolley lines are identified by machine vision using edge-finding or line-finding routines. In a further embodiment, both pairs of conductors corresponding to both directions of travel are identified, and the machine vision processing then selects the leftmost pair for targeting (or rightmost if driving on the opposite side of the roadway). In this embodiment, the positions for raising and lowering the pantograph may also be identified by machine vision or may continue to be identified in the same manner as in other embodiments.

It was discussed with respect to FIG. 2 that the user interface group 48 of the machine control system architecture 30 may include a selector to allow the user to activate or deactivate automatic machine guidance along the trolley line. In addition, other conditions are used as well in an embodiment to deactivate automatic control. Such other conditions may include an alert from a collision avoidance system, an end of line section condition, and so on.

Figure 5:
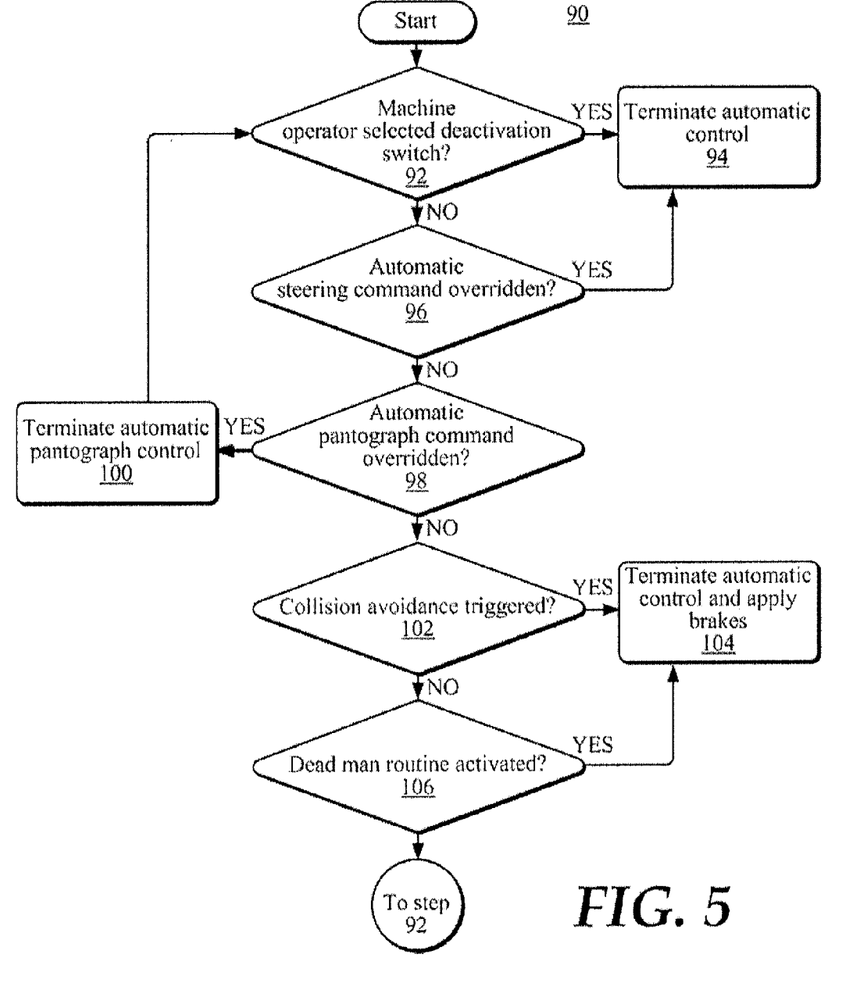
FIG. 5 is a flow chart showing a process for automatic control deactivation in accordance with an aspect of the disclosure.

The flow chart of FIG. 5 illustrates an exemplary controller-driven process 90 for terminating automatic control of the off-highway truck 10 according to an embodiment. It will be appreciated that the process 90 may be executed in parallel with the machine guidance process 50, and that termination of automatic guidance pursuant to the process 90 will also serve, in an embodiment, to terminate process 50. The process 90 may be begun when automatic control commences, e.g., via operator activation.

At stage 92 of the process 90, the controller 32 determines whether the machine operator has selected a deactivation switch, and if the operator has selected the deactivation switch, the controller 32 terminates automatic control at stage 94. Otherwise, the process 90 continues to stage 96, wherein the controller determines whether the machine operator has overridden an automatic steering command. If the operator has overridden an automatic steering command, the controller 32 terminates automatic control at stage 94, and otherwise continues to stage 98.

At stage 98, the controller 32 determines whether the machine operator has overridden an automatic pantograph raising or lowering command. If it is determined that the operator has overridden an automatic pantograph raising or lowering command, the controller 32 terminates automatic pantograph control at stage 100 and returns to stage 92. If it is determined that the operator has not overridden an automatic pantograph raising or lowering command, the process continues to stage 102, wherein the controller 32 determines whether a collision avoidance warning or alert has been triggered. For example, a forward-looking IR or other sensor system may detect based on machine heading and speed that a collision with another object in the roadway is imminent. If a collision avoidance warning or alert has been triggered, the controller 32 terminates automatic machine control and applies machine brakes at stage 104, and otherwise the process 90 proceeds to stage 106.

In an embodiment, an optional "dead man" switch may be included in the machine control system architecture 30. Such a switch requires constant pressure by the operator to avoid activation of a dead man routine. In this embodiment, it is determined at stage 106 whether the dead man routine has been activated, and if the dead man routine has been activated, the controller 32 terminates automatic machine control and applies machine brakes at stage 104. It will be appreciated that conditions for ceasing automatic machine control other than those listed above may be included in process 90 additionally or alternatively.

Industrial Applicability

In general, the present disclosure pertains to a system and method for automatically guiding an off-highway truck along a trolley line by sensing two or more roadside objects such as support poles associated with the trolley line and at a fixed distance from the trolley line, and using the determined position of the off-highway truck relative to the trolley line to automatically steer the off-highway truck.

In an embodiment, the sensors used to sense roadside support poles. The sensors may be laser sensors, which are used to triangulate the position of the off-highway truck relative to the roadside support poles, and hence to determine the position of the truck relative to the trolley line. A single sensor may be scanned to illuminate multiple poles, or alternatively multiple different sensors may be used.

In a further embodiment, the roadside poles include a reflective element such as a corner cube or retro-reflector placed at substantially the same height above the roadway on each pole, the height being about the height of the truck sensors. In this way, extraneous sensor signals from other roadside objects such as debris, sidelined machines, etc., can be minimized.

Using the described system and method, the operator of the off-highway truck is able to relax or concentrate on other tasks during periods of automatic guidance, substantially reducing operator fatigue and improving the efficiency of trolley line use. In some cases, the use of automatic guidance may also protect the truck and the trolley line infrastructure from damage.

It will be appreciated from the foregoing that the present disclosure provides an effective and efficient mechanism for guiding a truck to maintain contact between a pantograph and trolley line when the trolley line is available. While only certain embodiments have been set forth, alternatives and modifications will be apparent from the above description to those skilled in the art. These and other alternatives are considered equivalents and within the spirit and scope of this disclosure and the appended claims.

What is claimed is:

1. A method for guiding an off-highway truck along a roadway with respect to a trolley line, the off-highway truck having a processor configured as a controller, the method comprising:

the controller determining a position of the off-highway truck on the roadway by sensing two or more roadside objects located beside the roadway;

the controller using the determined position of the off-highway truck on the roadway and a known position of the trolley line relative to the two or more roadside objects to automatically determine a relative position of the off-highway truck under the trolley line; and based on the determined relative position of the off-highway truck under the trolley line, the controller automatically steering the off-highway truck to alter the position of the off-highway truck relative to the trolley line.

2. The method for guiding an off-highway truck along a roadway in accordance with claim 1 wherein the two or more roadside objects located beside the roadway are support poles for the trolley line.

3. The method for guiding an off-highway truck along a roadway in accordance with claim 2 wherein sensing the two or more roadside objects includes illuminating the two or more roadside objects with laser illumination.

4. The method for guiding an off-highway truck along a roadway in accordance with claim 3 wherein determining a position of the off-highway truck includes triangulating based on angular positions of the two or more roadside objects.

5. The method for guiding an off-highway truck along a roadway in accordance with claim 3 wherein each of the two or more roadside objects includes a reflector to reflect the laser illumination.

6. The method for guiding an off-highway truck along a roadway in accordance with claim 5 wherein the reflector is one of a retro-reflector and a reflective corner cube.

7. The method for guiding an off-highway truck along a roadway in accordance with claim 1, wherein the off-highway truck includes a pantograph for contacting the trolley line, the method further comprising automatically determining whether to raise or lower the pantograph based on the position of the off-highway truck and a predetermined feature of the trolley line.

8. The method for guiding an off-highway truck along a roadway in accordance with claim 7, wherein the predetermined feature of the trolley line is retrieved from a position-encoded map of the trolley line.

9. The method for guiding an off-highway truck along a roadway in accordance with claim 1, further including disabling automatic steering of the off-highway truck if an operator of the off-highway truck overrides an automatic steering action.

10. The method for guiding an off-highway truck along a roadway in accordance with claim 1, further including disabling automatic steering of the off-highway truck and activating a brake of the off-highway truck if an operator of the off-highway truck releases a dead man mechanism.

11. The method for guiding an off-highway truck along a roadway in accordance with claim 1, further including disabling automatic steering of the off-highway truck and activating a brake of the off-highway truck when an imminent collision is detected.

12. A system for automatic guidance of an off-highway truck at a work site, the work site including a trolley line for supplying electric power to the off-highway truck, the trolley line running along a roadway having two or more roadside features, the system comprising:
a pantograph for selectively contacting the trolley line;
one or more sensors associated with the off highway truck; and
a controller linked to the one or more sensors and to a machine steering control and configured to detect a position of the off-highway truck relative to the trolley line by detecting the two or more roadside features and to automatically steer the truck via the machine steering control to maintain the pantograph in contact with the trolley line.

13. The system for automatic guidance of an off-highway truck according to claim 12, wherein the controller is further linked to a pantograph control and is configured to automatically raise or lower the pantograph.

14. The system for automatic guidance of an off-highway truck according to claim 12, further comprising an operator interface including a selector to permit the user to activate or deactivate automatic machine guidance.

15. The system for automatic guidance of an off-highway truck according to claim 12, further comprising a data source linked to the controller and containing data identifying a lateral location of the trolley line relative to the two or more roadside features.

16. The system for automatic guidance of an off-highway truck according to claim 15, wherein the data source further contains data encoding start and stop locations of the trolley line, and wherein the controller is further configured to raise or lower the pantograph based on the start and stop locations of the trolley line.

17. The system for automatic guidance of an off-highway truck according to claim 15, further including a GPS receiver linked to the controller and providing data indicative of a current position of the off-highway truck.

18. The system for automatic guidance of an off-highway truck according to claim 12, wherein the one or more sensors associated with the off highway truck comprise one or more laser sensors.

19. The system for automatic guidance of an off-highway truck according to claim 12, wherein the two or more roadside features comprise a consecutive plurality of poles positioned at a fixed distance from one another in the direction of the roadway and positioned at a fixed distance from the trolley line in a direction perpendicular to the roadway.

20. A system for automatic guidance of an off-highway truck having an onboard laser sensor, the system including:
a trolley line for supplying electric power to the off-highway truck, the trolley line running along a roadway;
a plurality of poles positioned consecutively in the direction of the roadway and positioned at a fixed distance from the trolley line in a direction perpendicular to the roadway; and
a reflective element fixed to each of the plurality of poles at a fixed distance above the roadway such that the laser sensor of the off-highway truck is able to detect two or more of the plurality of poles based on reflections from the reflective elements associated with the two or more of the plurality of poles.

* * * * *

UNITED STATES PATENT AND TRADEMARK OFFICE
CERTIFICATE OF CORRECTION

| | |
|---|---|
| PATENT NO. | : 8,838,320 B2 |
| APPLICATION NO. | : 13/436810 |
| DATED | : September 16, 2014 |
| INVENTOR(S) | : Stratton et al. |

It is certified that error appears in the above-identified patent and that said Letters Patent is hereby corrected as shown below:

In the Specification

Column 8, line 12, delete "Industrial Applicability" and insert -- INDUSTRIAL APPLICABILITY --.

In the Claims

Column 8, line 59, in Claim 1, delete "deteimined" and insert -- determined --.

Signed and Sealed this
Fifteenth Day of September, 2015

Michelle K. Lee
*Director of the United States Patent and Trademark Office*